United States Patent
Norair

(10) Patent No.: US 9,497,715 B2
(45) Date of Patent: Nov. 15, 2016

(54) METHOD AND APPARATUS FOR ADDRESSING IN A RESOURCE-CONSTRAINED NETWORK

(75) Inventor: John Peter Norair, San Francisco, CA (US)

(73) Assignee: BLACKBIRD TECHNOLOGY HOLDINGS, INC., Dover, DE (US)

( * ) Notice: Subject to any disclaimer, the term of this patent is extended or adjusted under 35 U.S.C. 154(b) by 416 days.

(21) Appl. No.: 13/408,461

(22) Filed: Feb. 29, 2012

(65) Prior Publication Data

US 2012/0226822 A1  Sep. 6, 2012

Related U.S. Application Data

(60) Provisional application No. 61/464,376, filed on Mar. 2, 2011.

(51) Int. Cl.
*G06F 15/16* (2006.01)
*H04W 52/24* (2009.01)
(Continued)

(52) U.S. Cl.
CPC ......... *H04W 52/245* (2013.01); *H04B 17/318* (2015.01); *H04L 1/0061* (2013.01);
(Continued)

(58) Field of Classification Search
CPC ............ H04L 29/0608; H04L 29/08009; H04L 29/08018; H04L 29/08027; H04L 29/08036; H04L 29/08045; H04L 47/822; H04L 47/12; H04L 43/16; H04L 43/0847; H04L 1/0061; H04L 1/0083; H04L 69/22; H04W 80/02; H04W 80/04; H04W 80/06; H04W 56/0025; H04W 52/245; H04W 72/0473; H04W 74/0808; H04W 72/0446; H04W 56/001; H04W 52/36; H04W 52/242; H04B 17/318
USPC ........................................................ 709/245
See application file for complete search history.

(56) References Cited

U.S. PATENT DOCUMENTS 5,338,625 A  8/1994 Bates
5,590,328 A * 12/1996 Seno et al. ................... 718/105
(Continued)

FOREIGN PATENT DOCUMENTS

EP      1321009 B1   1/2007
WO   2006001556 A1   1/2006
WO   2009023592 A2   2/2009

OTHER PUBLICATIONS

TechNet (Microsoft TechNet, "Mapping IP Multicast to MAC-Layer Multicast", 2014, p. 1). Document is provided for support for clarification of the cited term 01:00:5e, Claims 4 & 13, 01:00:5e is beginning of Ethernet MAC address range used to deliver multicast packets.*

(Continued)

*Primary Examiner* — Brian J Gillis
*Assistant Examiner* — Michael A Keller
(74) *Attorney, Agent, or Firm* — McAndrews, Held & Malloy, Ltd.

(57) ABSTRACT

An electronic device may receive a protocol data unit (PDU) comprising a plurality of addressing bits. Data-link-layer processing of the PDU may be based on each of the addressing bits. Network layer processing of the PDU may be based on a first subset of the plurality of addressing bits. Transport-layer processing of the PDU may be based on a second subset of plurality of addressing bits. The data-link-layer processing may comprise determining whether the PDU is unicast-addressed or non-unicast-addressed. For a unicast-addressed PDU, the data-link-layer processing may comprise determining whether the PDU is destined for the electronic device based on a comparison of a Target ID field of the PDU and a device ID of the electronic device. For a non-unicast-addressed PDU, the Target ID field may not be present, and whether the PDU is destined for the electronic device may be determined based on other criteria.

12 Claims, 11 Drawing Sheets

(51) Int. Cl.
| | |
|---|---|
| *H04L 29/06* | (2006.01) |
| *H04L 1/00* | (2006.01) |
| *H04W 56/00* | (2009.01) |
| *H04L 12/26* | (2006.01) |
| *H04L 12/801* | (2013.01) |
| *H04L 12/911* | (2013.01) |
| *H04W 52/36* | (2009.01) |
| *H04B 17/318* | (2015.01) |
| *H04W 72/04* | (2009.01) |
| *H04W 74/08* | (2009.01) |

(52) U.S. Cl.
CPC ........... *H04L43/0847* (2013.01); *H04L 43/16* (2013.01); *H04L 47/12* (2013.01); *H04L 47/822* (2013.01); *H04L 69/22* (2013.01); *H04W 52/242* (2013.01); *H04W 52/36* (2013.01); *H04W 56/001* (2013.01); *H04W 56/0025* (2013.01); *H04W 72/0446* (2013.01); *H04W 72/0473* (2013.01); *H04W 74/0808* (2013.01); *H04L 1/0083* (2013.01)

(56) References Cited

U.S. PATENT DOCUMENTS

| | | | |
|---|---|---|---|
| 5,729,557 A | 3/1998 | Gardner et al. | |
| 5,959,281 A | 9/1999 | Domiteaux | |
| 6,115,379 A | 9/2000 | Flanders et al. | |
| 6,272,148 B1* | 8/2001 | Takagi et al. | 370/469 |
| 6,307,846 B1 | 10/2001 | Willey | |
| 6,330,700 B1 | 12/2001 | Morris | |
| 6,381,243 B1 | 4/2002 | Ekstedt | |
| 6,388,997 B1 | 5/2002 | Scott | |
| 6,424,301 B1 | 7/2002 | Johnson | |
| 6,452,569 B1 | 9/2002 | Park | |
| 6,665,308 B1 | 12/2003 | Rakib | |
| 6,700,491 B2 | 3/2004 | Shafer | |
| 6,705,531 B1 | 3/2004 | Norton | |
| 6,714,559 B1 | 3/2004 | Meier | |
| 6,771,985 B1 | 8/2004 | Iinuma | |
| 7,233,603 B2 | 6/2007 | Lee | |
| 7,280,555 B2 | 10/2007 | Stanforth | |
| 7,305,237 B2 | 12/2007 | Stephens | |
| 7,308,103 B2 | 12/2007 | Corcoran et al. | |
| 7,315,248 B2 | 1/2008 | Egbert | |
| 7,330,446 B2 | 2/2008 | Lee | |
| 7,369,512 B1 | 5/2008 | Shurbanov et al. | |
| 7,606,256 B2 | 10/2009 | Vitebsky | |
| 7,643,509 B2 | 1/2010 | Han et al. | |
| 7,672,284 B2 | 3/2010 | Sugar et al. | |
| 7,689,195 B2 | 3/2010 | Wu | |
| 7,698,463 B2 | 4/2010 | Ogier et al. | |
| 7,735,116 B1 | 6/2010 | Gauvin | |
| 7,760,689 B2 | 7/2010 | Shin | |
| 7,805,129 B1 | 9/2010 | Issa | |
| 7,814,107 B1 | 10/2010 | Thirumalai et al. | |
| 7,890,839 B2 | 2/2011 | Iwami | |
| 7,962,361 B2 | 6/2011 | Ramchandani | |
| 8,036,715 B2 | 10/2011 | Buck | |
| 8,351,409 B2 | 1/2013 | Albert | |
| 8,599,687 B1* | 12/2013 | Kleyman et al. | 370/230 |
| 2002/0025823 A1 | 2/2002 | Hara | |
| 2002/0078045 A1 | 6/2002 | Dutta | |
| 2003/0115369 A1 | 6/2003 | Walter | |
| 2003/0154243 A1 | 8/2003 | Crockett | |
| 2003/0183691 A1 | 10/2003 | Lahteenmaki | |
| 2004/0157631 A1 | 8/2004 | Stobart | |
| 2004/0218557 A1 | 11/2004 | Kim et al. | |
| 2005/0078038 A1 | 4/2005 | Takaki | |
| 2005/0083943 A1 | 4/2005 | Lee et al. | |
| 2005/0128086 A1 | 6/2005 | Brown | |
| 2005/0135291 A1 | 6/2005 | Ketchum et al. | |
| 2005/0139685 A1 | 6/2005 | Kozlay | |
| 2005/0174953 A1 | 8/2005 | Ho | |
| 2005/0255843 A1* | 11/2005 | Hilpisch et al. | 455/425 |
| 2006/0002312 A1 | 1/2006 | Delattre et al. | |
| 2006/0088021 A1 | 4/2006 | Nelson et al. | |
| 2006/0091223 A1 | 5/2006 | Zellner | |
| 2006/0175420 A1 | 8/2006 | Satou | |
| 2006/0219776 A1 | 10/2006 | Finn | |
| 2006/0220867 A1 | 10/2006 | Dixon | |
| 2007/0000316 A1 | 1/2007 | Lauer | |
| 2007/0010928 A1 | 1/2007 | Brusarosco | |
| 2007/0083924 A1 | 4/2007 | Lu | |
| 2007/0099641 A1 | 5/2007 | Lastinger | |
| 2007/0125836 A1 | 6/2007 | McAllister et al. | |
| 2007/0136509 A1 | 6/2007 | Agami | |
| 2007/0183415 A1* | 8/2007 | Fischer et al. | 370/389 |
| 2007/0232281 A1 | 10/2007 | Nakai | |
| 2007/0254619 A1* | 11/2007 | Salomone et al. | 455/343.2 |
| 2007/0295074 A1 | 12/2007 | Kobayakawa | |
| 2008/0013532 A1* | 1/2008 | Garner et al. | 370/389 |
| 2008/0041936 A1 | 2/2008 | Vawter | |
| 2008/0069097 A1 | 3/2008 | Motegi | |
| 2008/0075123 A1 | 3/2008 | Fourcand | |
| 2008/0107060 A1 | 5/2008 | Andou et al. | |
| 2008/0130597 A1 | 6/2008 | Kalhan | |
| 2008/0164325 A1 | 7/2008 | Borracci | |
| 2008/0172357 A1 | 7/2008 | Rechis | |
| 2008/0186857 A1 | 8/2008 | Becker | |
| 2008/0186867 A1 | 8/2008 | Schoo et al. | |
| 2008/0209322 A1 | 8/2008 | Kaufman | |
| 2008/0228592 A1 | 9/2008 | Kotas | |
| 2008/0238621 A1 | 10/2008 | Rofougaran | |
| 2008/0256409 A1 | 10/2008 | Oran et al. | |
| 2008/0302177 A1 | 12/2008 | Sinnett | |
| 2008/0313450 A1* | 12/2008 | Rosenberg | 713/2 |
| 2008/0320139 A1 | 12/2008 | Fukuda | |
| 2009/0003376 A1 | 1/2009 | Horvat | |
| 2009/0034491 A1 | 2/2009 | Adams | |
| 2009/0055377 A1 | 2/2009 | Hedge | |
| 2009/0067427 A1* | 3/2009 | Rezaki | H04L 45/00 370/392 |
| 2009/0069049 A1 | 3/2009 | Jain | |
| 2009/0073070 A1 | 3/2009 | Rofougaran | |
| 2009/0113267 A1 | 4/2009 | Harrison | |
| 2009/0138948 A1 | 5/2009 | Calamera | |
| 2009/0141531 A1 | 6/2009 | Abedin | |
| 2009/0150646 A1 | 6/2009 | Allen | |
| 2009/0171749 A1 | 7/2009 | Laruelle | |
| 2009/0171947 A1 | 7/2009 | Karayel | |
| 2009/0210898 A1 | 8/2009 | Childress et al. | |
| 2009/0251295 A1 | 10/2009 | Norair | |
| 2009/0268674 A1 | 10/2009 | Liu | |
| 2009/0279652 A1 | 11/2009 | Sinha | |
| 2009/0286496 A1 | 11/2009 | Yavuz et al. | |
| 2009/0292418 A1 | 11/2009 | Kuykendal | |
| 2010/0011156 A1 | 1/2010 | Yim | |
| 2010/0026589 A1 | 2/2010 | Dou | |
| 2010/0027558 A1 | 2/2010 | Han | |
| 2010/0052859 A1 | 3/2010 | Lossau | |
| 2010/0078471 A1 | 4/2010 | Lin | |
| 2010/0097946 A1 | 4/2010 | Celentano | |
| 2010/0097956 A1 | 4/2010 | Tauil | |
| 2010/0097957 A1 | 4/2010 | Pirzada et al. | |
| 2010/0118737 A1 | 5/2010 | Kim | |
| 2010/0177696 A1 | 7/2010 | Jung | |
| 2010/0179877 A1 | 7/2010 | Lam | |
| 2010/0181377 A1 | 7/2010 | Chen | |
| 2010/0190437 A1 | 7/2010 | Buhot | |
| 2010/0197261 A1 | 8/2010 | Zibrik et al. | |
| 2010/0228617 A1 | 9/2010 | Ransom et al. | |
| 2010/0232408 A1 | 9/2010 | Lim | |
| 2010/0256976 A1 | 10/2010 | Atsmon | |
| 2010/0280904 A1 | 11/2010 | Ahuja | |
| 2010/0295681 A1 | 11/2010 | Burns et al. | |
| 2011/0003607 A1 | 1/2011 | Forenza et al. | |
| 2011/0007733 A1 | 1/2011 | Kubler et al. | |
| 2011/0074552 A1 | 3/2011 | Norair | |
| 2011/0112892 A1 | 5/2011 | Tarantino | |
| 2011/0116513 A1* | 5/2011 | Gilson | 370/469 |
| 2012/0001730 A1 | 1/2012 | Potyrailo | |
| 2012/0086615 A1 | 4/2012 | Norair | |

(56) References Cited

U.S. PATENT DOCUMENTS

| | | |
|---|---|---|
| 2012/0087267 A1 | 4/2012 | Norair |
| 2012/0087350 A1 | 4/2012 | Norair |
| 2012/0088449 A1 | 4/2012 | Norair |
| 2012/0116694 A1 | 5/2012 | Norair |
| 2012/0116887 A1 | 5/2012 | Norair |
| 2012/0118952 A1 | 5/2012 | Norair |
| 2012/0191848 A1 | 7/2012 | Norair |
| 2012/0191901 A1 | 7/2012 | Norair |
| 2012/0201246 A1* | 8/2012 | Fernandez Gutierrez .... 370/390 |
| 2012/0207141 A1 | 8/2012 | Norair |
| 2012/0209716 A1 | 8/2012 | Burns |
| 2012/0224491 A1 | 9/2012 | Norair |
| 2012/0224530 A1 | 9/2012 | Norair |
| 2012/0224543 A1 | 9/2012 | Norair |
| 2012/0224590 A1 | 9/2012 | Norair |
| 2012/0225687 A1 | 9/2012 | Norair |
| 2012/0226955 A1 | 9/2012 | Norair |
| 2013/0017788 A1 | 1/2013 | Norair |

OTHER PUBLICATIONS

Screen shot of http://www.thefreedictionary.com/done defining the definition of done, retrieved Jul. 10, 2014.*

Screen shot of http://www.thefreedictionary.com/based defining the definition of based, retrieved Jul. 10, 2014.*

PCT Int'l Searching Authority, Notification Concerning Transmittal of the Int'l Search Report and the Written Opinion of the Int'l Searching authority or the Declaration in Int'l application No. PCT/US2012/027386 dated Oct. 16, 2012.

PCT International Searching Authority, Notification Concerning Transmittal of the International Search Report and the Written Opinion of the International Searching Authority, or the Declaration, in International application No. PCT/US2011/55118, dated Feb. 28, 2012. (25 pages).

PCT International Searching Authority, Notification Concerning Transmittal of the International Search Report and the Written Opinion of the International Searching Authority, or the Declaration, in International application No. PCT/US11/55082, dated Mar. 1, 2012 (13 pages).

PCT International Searching Authority, Notification Concerning Transmittal of the International Search Report and the Written Opinion of the International Searching Authority, or the Declaration, in International application No. PCT/US11/55934, dated Mar. 6, 2012 (11 pages).

PCT International Searching Authority, Notification Concerning Transmittal of the International Search Report and the Written Opinion of the International Searching Authority, or the Declaration, in International application No. PCT/US2011/055929, dated Jan. 30, 2012. (15 pages).

PCT International Searching Authority, Notification Concerning Transmittal of the International Search Report and the Written Opinion of the International Searching Authority, or the Declaration, in International application No. PCT/US2011/059292, dated Feb. 2, 2012. (12 pages).

PCT International Searching Authority, Notification Concerning Transmittal of the International Search Report and the Written Opinion of the International Searching Authority, or the Declaration, in International application No. PCT/US11/059304, dated Mar. 9, 2012 (11 pages).

PCT International Searching Authority, Notification Concerning Transmittal of the International Search Report and the Written Opinion of the International Searching Authority, or the Declaration, in International application No. PCT/US2011/060950, dated Mar. 16, 2012. (14 pages).

PCT International Searching Authority, Notification Concerning Transmittal of the International Search Report and the Written Opinion of the International Searching Authority, or the Declaration, in International application No. PCT/US12/22005, dated Mar. 29, 2012. (12 pages).

PCT International Searching Authority, Notification Concerning Transmittal of the International Search Report and the Written Opinion of the International Searching Authority, or the Declaration, in International application No. PCT/US12/22002, dated May 8, 2012. (13 pages).

PCT International Searching Authority, Notification Concerning Transmittal of the International Search Report and the Written Opinion of the International Searching Authority, or the Declaration, in International application No. PCT/US2012/025191 dated May 25, 2012 (8 pages).

PCT International Searching Authority, Notification Concerning Transmittal of the International Search Report and the Written Opinion of the International Searching Authority, or the Declaration, in International application No. PCT/US2012/025197 dated May 25, 2012 (7 pages).

PCT International Searching Authority, Notification Concerning Transmittal of the International Search Report and the Written Opinion of the International Searching Authority, or the Declaration, in International application No. PCT/US2012/027382 dated May 31, 2012 (10 pages).

PCT International Searching Authority, Notification Concerning Transmittal of the International Search Report and the Written Opinion of the International Searching Authority, or the Declaration, in International application No. PCT/US2012/027381 dated May 31, 2012 (13 pages).

PCT International Searching Authority, Notification Concerning Transmittal of the International Search Report and the Written Opinion of the International Searching Authority, or the Declaration, in International application No. PCT/US2012/027387 dated Jun. 6, 2012 (14 pages).

PCT International Searching Authority, Notification Concerning Transmittal of the International Search Report and the Written Opinion of the International Searching Authority, or the Declaration, in International application No. PCT/US2012/27378 dated Jun. 13, 2012 (14 pages).

PCT International Searching Authority, Notification Concerning Transmittal of the International Search Report and the Written Opinion of the International Searching Authority, or the Declaration, in International application No. PCT/US2012/027379 dated Jun. 20, 2012 (16 pages).

PCT International Searching Authority, Notification Concerning Transmittal of the International Search Report and the Written Opinion of the International Searching Authority, or the Declaration, in International application No. PCT/US2012/027384 dated Jun. 20, 2012 (10 pages).

* cited by examiner

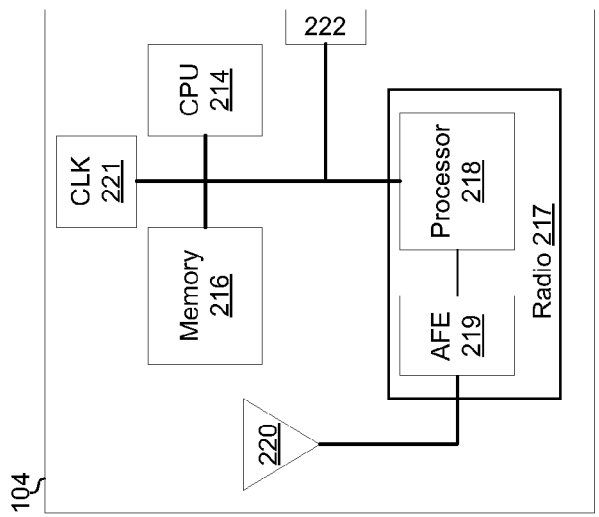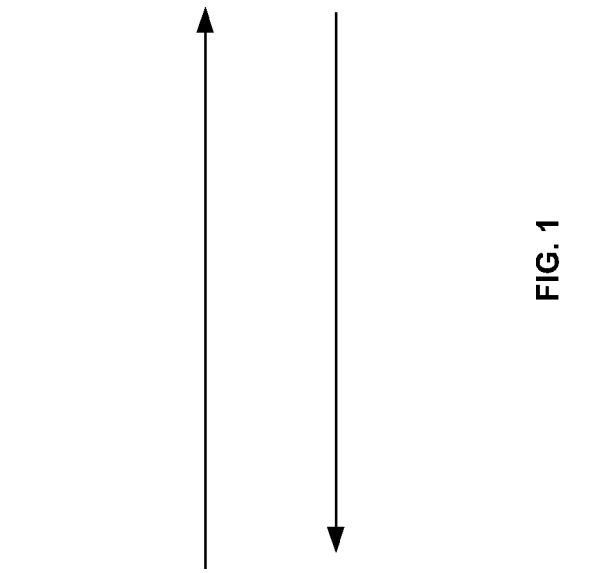
FIG. 1

| Comparison template, M2QP Opcode = file | Comparison File ID | Comparison Byte Offset |

FIG. 5A

| Comparison template, M2QP Opcode = series | Comparison series ID | Comparison Byte Offset |

FIG. 5B

| Call template, M2QP Opcode = file | Max returned bytes | Return file ID | Return File Entry Offset |

FIG. 5C

| Call template, M2QP Opcode = series | Max returned bytes | Series ID | File Series Data Offset |

FIG. 5D

| Return template, M2QP Opcode = file | Return file ID | File offset | IFSB total length | File data |

FIG. 5E

| Return template, M2QP Opcode = series | Series ID | Series length | File series data offset | File series total data length | File 1 ID | File 1 length | ... | File L ID | File L length | File series data starting at offset |

FIG. 5F

METHOD AND APPARATUS FOR ADDRESSING IN A RESOURCE-CONSTRAINED NETWORK

CLAIM OF PRIORITY

This patent application makes reference to, claims priority to and claims benefit from U.S. Provisional Patent Application Ser. No. 61/464,376 entitled "Advanced Communication System for Wide-area Low Power Wireless Applications and Active RFID" and filed on Mar. 2, 2011.

The above-referenced application is hereby incorporated herein by reference in its entirety.

INCORPORATION BY REFERENCE

This patent application also makes reference to:
U.S. Provisional Patent Application Ser. No. 61/464,376 titled "Advanced Communication System for Wide-Area Low Power Wireless Applications and Active RFID" and filed on Mar. 2, 2011;
U.S. Provisional Patent Application Ser. No. 61/572,390 titled "System for Adding Dash7-Based Applications Capability to a Smartphone" and filed on Jul. 15, 2011;
U.S. patent application Ser. No. 13/267,640 titled "Method and Apparatus for Adaptive Searching of Distributed Datasets" and filed on Oct. 6, 2011;
U.S. patent application Ser. No. 13/267,621 titled "Method and Apparatus for Low-Power, Long-Range Networking" and filed on Oct. 6, 2011;
U.S. patent application Ser. No. 13/270,802 titled "Method and Apparatus for a Multi-band, Multi-mode Smartcard" and filed on Oct. 11, 2011;
U.S. patent application Ser. No. 13/270,959 titled "Method and Apparatus for an Integrated Antenna" and filed on Oct. 11, 2011;
U.S. patent application Ser. No. 13/289,054 titled "Method and Apparatus for Electronic Payment" and filed on Nov. 4, 2011;
U.S. patent application Ser. No. 13/289,050 filed on Nov. 4, 2011;
U.S. patent application Ser. No. 13/297,348 titled "Method and Apparatus for Interfacing with a Smartcard" and filed on Nov. 16, 2011;
U.S. patent application Ser. No. 13/354,513 titled "Method and Apparatus for Memory Management" and filed on Jan. 20, 2012;
U.S. patent application Ser. No. 13/354,615 titled "Method and Apparatus for Discovering, People, Products, and/or Services via a Localized Wireless Network" and filed on Jan. 20, 2012;
U.S. patent application Ser. No. 13/396,708 titled "Method and apparatus for Plug and Play, Networkable ISO 18000-7 Connectivity" and filed on Feb. 15, 2012;
U.S. patent application Ser. No. 13/396,739 titled "Method and Apparatus for Serving Advertisements in a Low-Power Wireless Network" and filed on Feb. 15, 2012;
U.S. patent application Ser. No. 13/408,440 titled "Method and Apparatus for Forward Error Correction (FEC) in a Resource-Constrained Network" and filed on Feb. 29, 2012;
U.S. patent application Ser. No. 13/408,447 titled "Method and Apparatus for Adaptive Traffic Management in a Resource-Constrained Network" and filed on Feb. 29, 2012;
U.S. patent application Ser. No. 13/408,453 titled "Method and Apparatus for Dynamic Media Access Control in a Multiple Access System" and filed on Feb. 29, 2012;
U.S. patent application Ser. No. 13/408,457 titled "Method and Apparatus for Rapid Group Synchronization" and filed on Feb. 29, 2012;
U.S. patent application Ser. No. 13/408,464 titled "Method and Apparatus for Query-Based Congestion Control" and filed on Feb. 29, 2012; and
U.S. patent application Ser. No. 13/408,466 titled "Method and Apparatus for Power Autoscaling in a Resource-Constrained Network" and filed on Feb. 29, 2012.

Each of the above stated applications is hereby incorporated herein by reference in its entirety.

FIELD OF THE INVENTION

Certain embodiments of the invention relate to networking. More specifically, certain embodiments of the invention relate to a method and apparatus for addressing in a resource-constrained network.

BACKGROUND OF THE INVENTION

Existing methods and system for addressing in a wireless network are inefficient. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or apparatus is provided for addressing in a resource-constrained network, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

FIG. 1 depicts exemplary communication devices which may comprise a dynamically adaptable media access controller.

FIGS. 5A-5F depict the structure of exemplary portions of a transport-layer PDU.

DETAILED DESCRIPTION OF THE INVENTION

Figure 2:
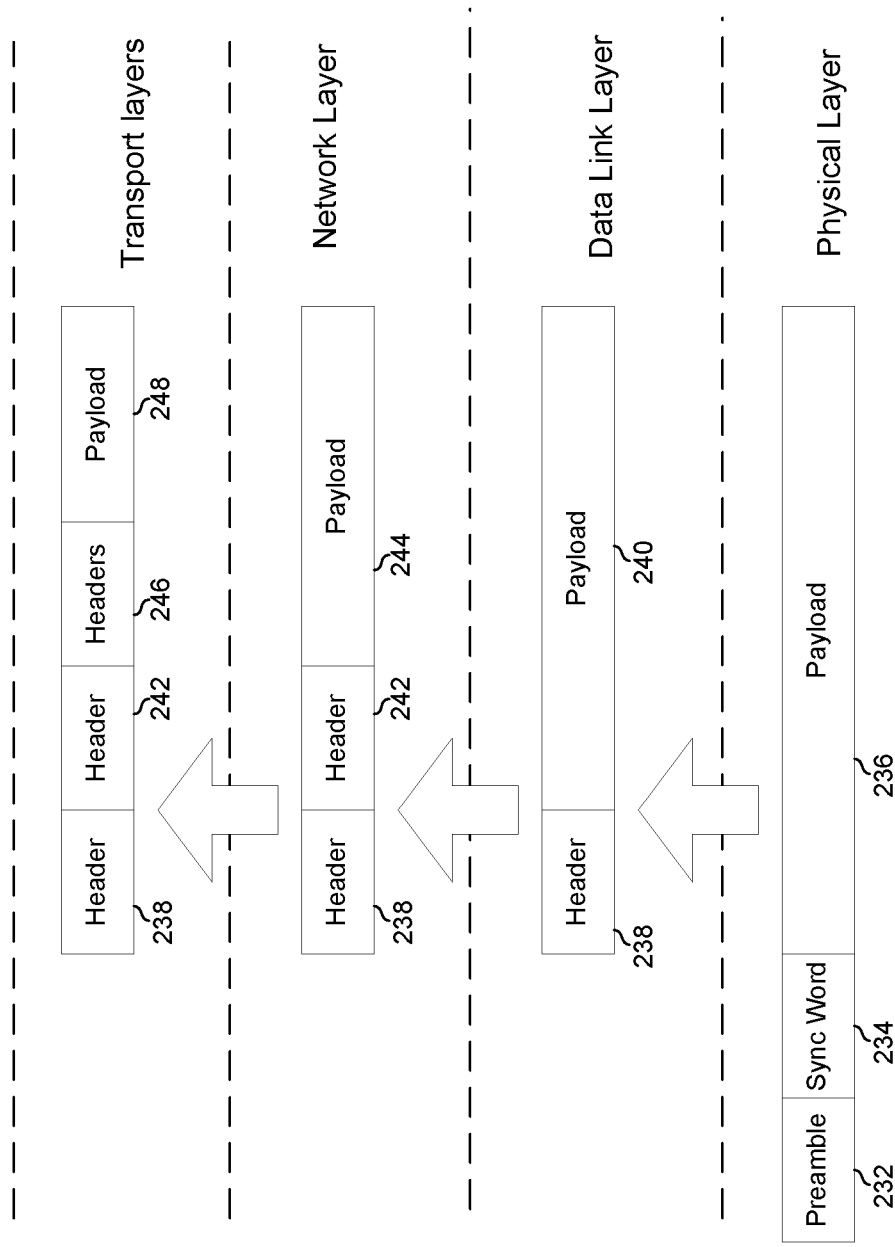
FIG. 2 is a diagram illustrating prosessing of a received PDU as it traverses the physical layer, data link layer, and transport layer in an electronic device.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the term "e.g.," "for example," introduce a list of one or more non-limiting examples, instances, or illustrations.

FIG. 1 depicts exemplary communication devices which may comprise a dynamically adaptable media access controller. Shown in FIG. 1 are details of an exemplary first device 102 and details of an exemplary second device 104.

The CPU 204 may comprise circuitry operable to control operation of the first device 102. The CPU 204 may, for example, execute an operating system and/or other programs such (e.g., programs that enable a user interface of the device 102). The CPU 204 may generate one or more control signals for controlling the operation of the device 102. The CPU 204 may, for example, control a mode of operation of the device 102.

The CPU 214 may comprise circuitry operable to control operation of the second device 104. In some instances, the CPU 214 may be substantially similar to the CPU 204. In instances that the device 102 is less resource-constrained device, such as a base station or network controller, and the device 104 is more resource-constrained device, such as a battery-powered tag or a smartcard as described in above-incorporated U.S. patent application having Ser. No. 13/270, 802, the CPU 204 may be less-complex (e.g., comprise fewer gates, utilize less power, utilize less memory, etc.) than the CPU 214. In one embodiment, for example, the CPU 204 may comprise a RISC or ARM processor, and the CPU 214 may comprise a state-machine having a relatively small number of states (e.g., four states).

The radio 207 may comprise a processor 208 and an analog front-end (AFE) 209. The processor 208 may comprise circuitry operable to interface with the AFE 209 to receive and transmit data, and to process received and to-be-transmitted data. For transmission, the processor 208 may be operable to receive data from the CPU 204 and/or memory 206, encode, packetize, and/or otherwise process the data to prepare it for transmission in accordance with one or more wireless protocols, and output the data to the AFE 209 for transmission. For reception, the processor 208 may be operable to receive data via the AFE 209, process the received data and output received data to the memory 206 and/or the CPU 204. Exemplary protocols which may be supported by the second device 104 include the ISO 18000-7 standard, and protocols described in the above-incorporated U.S. Provisional Patent Application having Ser. No. 61/464, 376 filed on Mar. 2, 2011.

The radio 217 may comprise a processor 218 and an analog front-end (AFE) 219. The baseband processor 218 may comprise circuitry operable to interface with the AFE 219 to receive and transmit data, and to process received and to-be-transmitted data. In some instances, the baseband processor 218 may be substantially similar to the baseband processor 208. In instances that the device 102 is less-resource-constrained device, such as a base station or network controller, and the device 104 is a more-resource-constrained device, such as a battery-powered tag, the baseband processor 218 may be less-complex (e.g., comprise fewer gates, utilize less power, utilize less memory, etc.) than the baseband processor 208. In one embodiment, for example, the baseband processor 208 may be operable to implement more complex signal processing algorithms (e.g., FEC decoding) than the baseband processor 218.

The analog front-end (AFE) 209 may comprise circuitry suitable for processing received and/or to-be-transmitted data in the analog domain. For transmission, the AFE 209 may receive digital data from the baseband processor 208, process the data to generate corresponding RF signals, and output the RF signals to the antenna 210. For reception, the AFE 209 may receive RF signals from the antenna 210, process the RF signals to generate corresponding digital data, and output the digital data to the baseband processor 209. In some instances, the AFE 219 may be substantially similar to the AFE 209. In instances that the device 102 is less-resource-constrained device, such as a base station or network controller, and the device 104 is a more-resource-constrained device, such as a battery-powered tag, the AFE 219 may be less-complex (e.g., comprise fewer gates, utilize less power, utilize less memory, etc.) than the AFE 209. In one embodiment, for example, the AFE 209 may comprise a more-sensitive receiver, a more powerful transmitter than the AFE 219.

Circuitry of the memory 206 may comprise one or more memory cells and may be operable to store data to the memory cell(s) and read data from the memory cell(s). The one or more memory cell may comprise one or more volatile memory cells and/or one or more non-volatile memory cells. The memory 206 may store data arranged, for example, as an indexed short file block (ISFB) and/or indexed short file series block (ISFSB) as described in the above-incorporated U.S. Provisional Patent Application having Ser. No. 61/464, 376.

Circuitry of the memory 216 may comprise one or more memory cells and may be operable to read data from the memory cell(s) and/or store data to the memory cell(s). The memory 216 may store data arranged, for example, as an indexed short file block (ISFB) and/or indexed short file series block (ISFSB) as described in the above-incorporated U.S. Provisional Patent Application having Ser. No. 61/464, 376. In some instances, the memory 216 may be substantially similar to the memory 206. In instances that the device 104 is resource-constrained, the memory 216 may be less-complex (e.g., comprise fewer gates, utilize less power, etc.) than the memory 206.

Each of the clocks 211 and 221 may be operable to generate one or more oscillating signals which may be utilized to control synchronous circuitry of the device 100. The clock 211 may comprise, for example, one or more crystal oscillators, phase-locked loops, and/or direct digital synthesizers. The clock 211 may also comprise a "date/time" or "real-time" clock operable to keep track of time of day, day of week, day of month, month, and/or year.

The interfaces 212 and 222 may enable configuring and/or programming the devices 102 and 104, respectively. In an exemplary embodiment, one or more values of one or more timing parameters may be programmed via the programming interfaces 212 and/or 222.

Each of the antennas 210 and 220 may be operable to transmit and receive electromagnetic signals in one or more frequency bands. In an embodiment of the invention, the antennas 210 and 220 may be operable to transmit and receive signals in the ISM frequency band centered at 433.92 MHz.

In operation, the device 102 may be, for example, a base station or network controller, and the device 104 may be a mobile device such as a smart phone or a smartcard. The devices 102 and 104 may communicate via the radios 207 and 217. Each protocol data unit (PDU) communicated between the devices 102 and 104 may utilize one of the following four types of addressing: broadcast, unicast, multicast, and anycast.

As utilized herein, a broadcast-addressed PDU is destined for all devices. Accordingly, the device 102/104 may treat all received broadcast-addressed PDUs as being destined for the device 102/104.

As utilized herein, a unicast-addressed PDU is destined for a specific device which has a device ID that matches a Target ID field of the unicast PDU. Accordingly, the device 102/104 may treat a received unicast-addressed PDU as being destined for the device 102/104 only if the Target ID field of the PDU matches the device ID of the device 102/104.

As utilized herein, a multicast-addressed PDU is destined for any one or more devices which meet certain criteria (other than Target ID). Accordingly, the device 102/104 may treat a received multicast-addressed PDU as being destined for the device 102/104 only if the device 102/104 meets certain criteria set forth in the PDU.

As utilized herein, an anycast-addressed PDU is destined for any one or more devices which meet certain criteria and may be forwarded by devices which do not meet the certain criteria. Accordingly, the device 102/104 may treat a received anycast-addressed PDU as being destined for the device 102/104 only if the device 102/104 meets certain criteria set forth in the PDU. Furthermore, the device 102/104 may treat a received anycast-addressed PDU as not being destined for the device 102/104 if the device 102/104 does not meets certain criteria set forth in the PDU. The device 102/104 may, nevertheless, forward the anycast-addressed PDU that was not destined for it.

FIG. 2 is a diagram illustrating processing of a received PDU as it traverses the physical layer, data link layer, and transport layer in an electronic device. As shown in FIG. 2, the physical-layer PDU comprises a preamble 232, a sync word 234, and a payload 236. The physical layer may synchronize to the preamble and inspect the sync word. The physical layer may remove the preamble 232 and synch word 234 and pass the payload 236 to the data link layer. The payload 236 passed to the data link layer may comprise header 238 and a payload 240. The data link layer may inspect the header 238 and process the PDU accordingly. The data link layer may pass both the header 238 and the payload 240 to the network layer. The network layer may inspect the header 238 and a header 242 which was contained in the payload 240. The network layer may then perform routing based on the headers 238 and/or 242. The network layer may pass the header 238, the header 242, and the payload 244 to the transport layer. The transport layer may inspect the header 238, the header 242, and the header 246 and process the PDU accordingly.

Figure 3A:
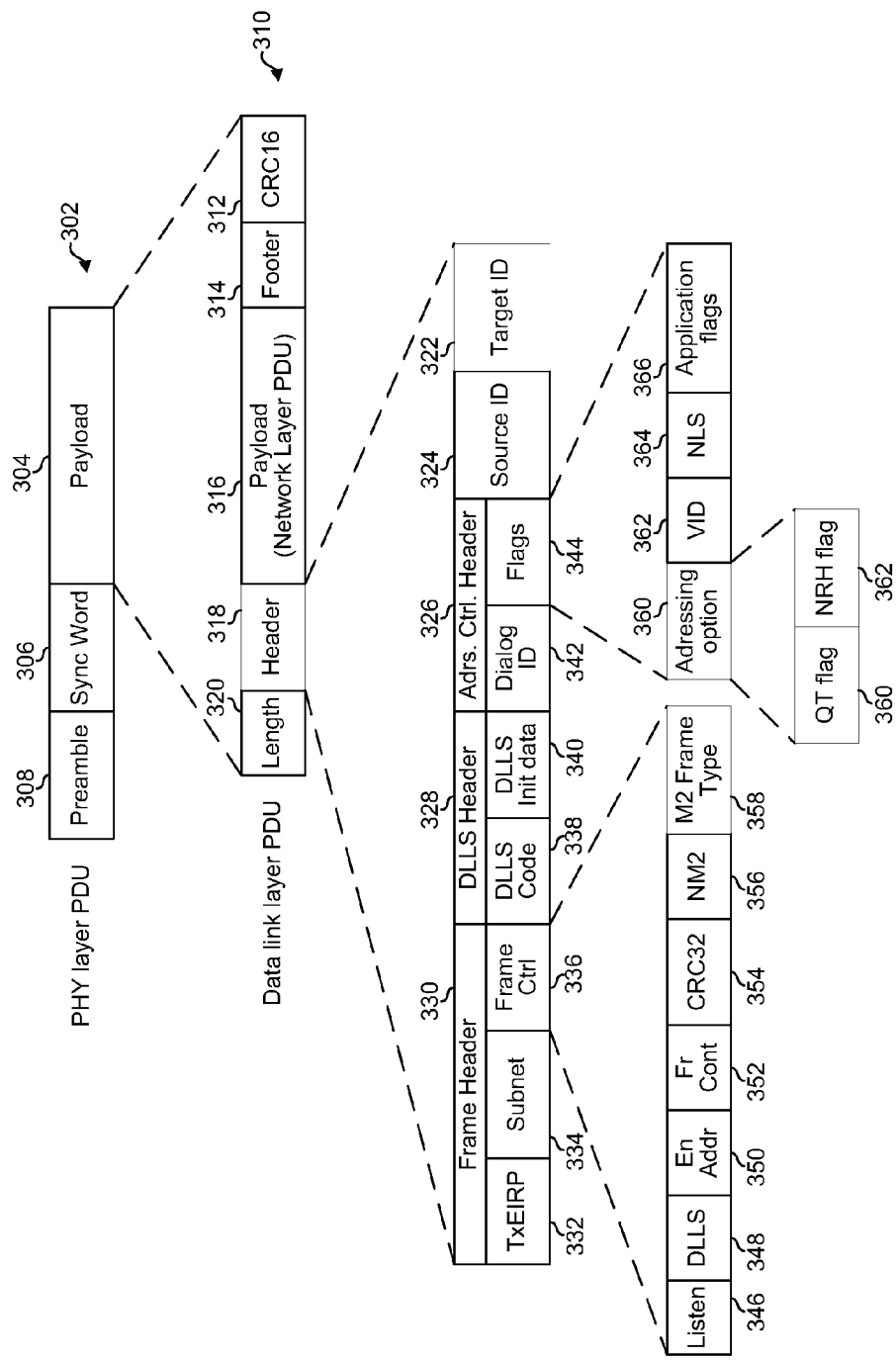
FIGS. 3A and 3B illustrate an exemplary protocol data unit (PDU) structure.
Figure 3B:
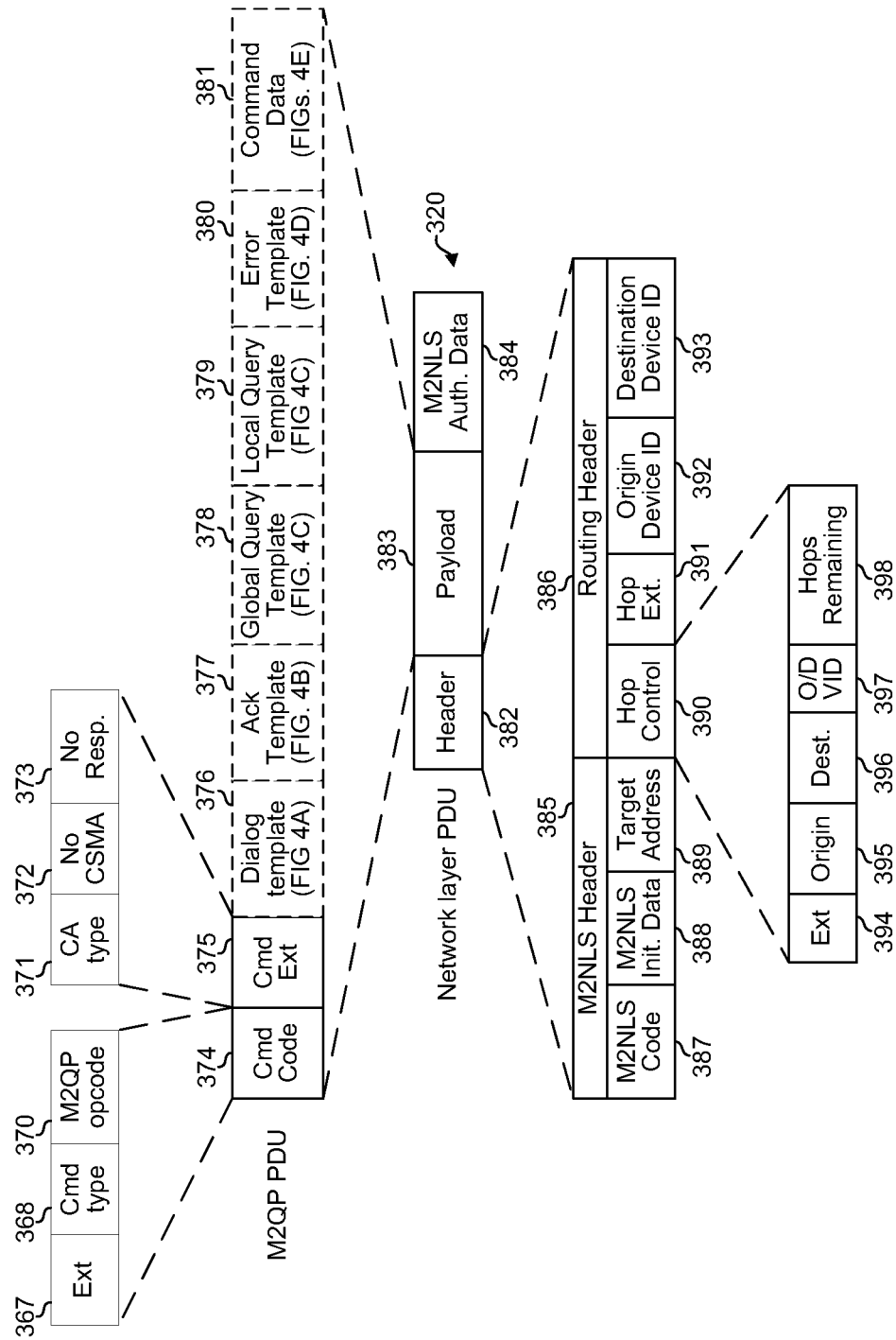

FIGS. 3A and 3B illustrate an exemplary protocol data unit (PDU) structure. Referring to FIG. 3A, the physical layer PDU 302 comprises a preamble 308, a sync word 306, and a payload 304. The payload 304 comprises a data link layer PDU 310 which, in turn, comprises a length field 320, a header 318, a payload 316, a footer 314, and a CRC field 312. The header 318, in turn, comprises a frame header 330, a DLLS header 328, an address control header 326, a source ID field 324, and a target ID field 322. The frame header 330 comprises a TxEIRP field 332, a subnet field 334, and a frame control field 336. The DLLS header 328 comprises a data link layer security (DLLS) code field 338 and DLLS initialization data field 340. The Address control header 326 comprises a dialog identifier field 342, and a flags field 344. The frame control field 336 comprises a listen flag 346, a DLLS flag 348, an enable addressing flag 350, a frame continuity flag 352, a CRC32 flag 354, a not mode 2 flag 356, and a mode 2 frame type field 358. The flags field 344 comprises an addressing option field 260, a virtual ID flag 362, a network layer security flag 364, and application flags 366 The addressing option field comprises a Query Template flag 360 and a No Routing Header flag 362.

The preamble 308 comprises a series of bits to enable a device receiving the PDU to synchronize its circuitry. The sync word field 306 indicates whether the PDU 302 is a foreground or background PDU (background PDUs may be utilized, for example, for synchronization as described in the above-incorporated U.S. patent application Ser. No. 13/408, 457).

The length field 320 indicate the length of the PDU 310. The payload 316 is described below with respect to FIG. 3B. The footer field 314 is utilized for data link layer security (DLLS). The cyclic redundancy check (CRC) field 312 is used to determine whether the PDU 310 was received without errors.

The TxEIRP field 332 indicates the power at which the PDU 302 was transmitted. The subnet field 334 is utilized for addressing the PDU 310 to certain devices. The listen flag 346 indicate whether the device that transmitted the PDU 302 will listen for responses. The DLLS flag 348 indicates whether the DLLS header 328 is present. The enable addressing flag 350 indicates whether the address control header 326 and the source ID field 324 are present. The frame continuity flag 352 indicates whether another PDU should immediately follow the PDU 302. The CRC32 flag 354 indicates a CRC algorithm utilized for the PDU 310. The not-mode-2 flag 356 indicates whether the frame type field has an unspecified/proprietary value and/or whether a header extension field is present. The mode 2 frame type field 358 indicates a type of the PDU 310 (e.g., whether the PDU 310 is a dialog frame, a dialog NACK, or a stream frame).

The addressing option field 360 indicates whether the PDU 310 is broadcast, multicast, anycast, or unicast addressed. In an exemplary embodiment, if the contents of the addressing option field 360 are determined to be '00' during data-link-layer processing of the PDU 310, the PDU 310 is determined to be a unicast-addressed PDU. If the contents of the addressing option field 360 are determined to be other than '00' during data-link-layer processing of the PDU 310, the PDU 310 is treated as a broadcast-addressed PDU at the data link layer. The Query Template flag 360 indicates whether a Query Template is present in the network layer PDU 316 (described below with respect to FIG. 3B). The No Routing Header flag 360 indicates whether a Routing Header 386 is present in the network layer PDU 316 (described below with respect to FIG. 3B).

The source ID field 324 contains a device-specific identifier of the device which transmitted the PDU 310. The target ID field 322 is present if the PDU 310 is unicast-addressed and contains the device-specific identifier of a device for which the unicast-addressed PDU 310 is destined.

Now referring to FIG. 3B, the network layer PDU 320 comprises a header 382, a payload 383, and a Mode 2 Network Layer Security (M2NLS) authorization data 384. The header 382 comprises an M2NLS header 385 and a Routing Header 386. The M2NLS header 385 comprises M2NLS code field 387, M2NLS initialization data field 388, and a target address field 389. The M2NLS code field 387 defines the usage of the M2NLS initialization data field 388. The M2NLS initialization data field 388 contains initialization data for a security process. The target address field 389, when present (e.g., because NLS is in use), contains the same device ID as is contained in the Target ID field 322.

The Routing Header 386 comprises a hop control field 390, a hop extension field 391, an origin device ID field 392, and a destination device ID field 393. The hop control field 390 comprises an extension field flag 394, an Origin ID flag 395, a destination ID flag 396, a VID flag 397, and a hops remaining field 398. The extension field flag 394 indicates whether the hop extension field 391 is present in the PDU. The Origin ID flag 395 indicates whether the Origin device ID field 392 is present in the PDU. The destination ID flag 396 indicates whether the Destination device ID field 392 is present in the PDU. The VID flag 397 indicates whether the Origin device ID field 393 and the Destination device ID field 393 is a hardware-unique ID or a virtual ID. The hops remaining field 398 indicates the number of hops remaining before forwarding of the PDU must cease. The hop extension field 389 contains data relevant to the routing/hopping algorithm in use. The origin device ID field 390 contains a device-specific identifier 390 of the device from which the PDU 320 originated. The destination device ID field 391 contains a device-specific identifier 390 of the ultimate destination of the PDU 320.

The payload 383 comprises a transport-layer PDU comprising a command code field 374, a command extension field 375, and one or more of the templates 376-381 described with respect to FIGS. 4A-4E. The command code field 374 comprises an extension flag 367, a command type field 368, and an opcode field 370. The extension flag 367 indicates whether the command extension field 375 is present. The command type field 368 indicates a network protocol associated with the PDU 320, whether the PDU 320 is a response, an error response, an initial request, an intermediate request, or a final request. The opcode field 370 indicates the type of transport layer PDU contained in the PDU 320. The command extension field 375 comprises a collision avoidance (CA) type field 371, a no collision sense multiple access (CSMA) field 372, and a no response field 373. The collision avoidance type field 371 indicates an algorithm or equation to be utilized for calculating parameter values utilized for CSMA and/or other functions. The no CSMA flag 372 indicates whether devices responding to the PDU 320 should utilize CSMA when responding. The no response flag 373 indicates whether devices receiving the PDU 320 should send a response.

Figure 4A:
FIGS. 4A-4E depict the structure of exemplary portions of a transport-layer PDU.
Figure 4B:
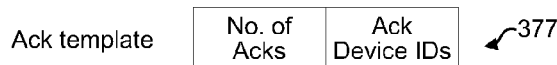
Figure 4C:
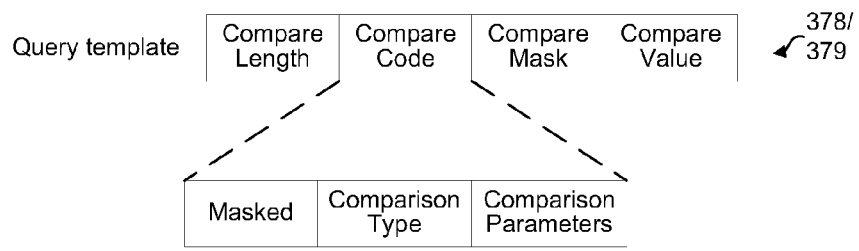
Figure 4D:
Figure 4E:

FIGS. 4A-4E depict the structure of exemplary portions of a transport-layer PDU. In FIG. 4A, the dialog template 376 comprises a response timeout field, a response channel list length field, and a response channel list. In FIG. 4B, the ack template 377 comprises a number of ack fields and an ack device IDs field. In FIG. 4C, the query template 378/379 comprises a compare length field, a compare code field, a compare mask field, and a compare value field. The compare code field may comprise a mask enable flag, a comparison type field, and a comparison parameters field. In FIG. 4D, the error template 380 comprises an error code field, an error subcode field, an M2QP error data field, and an extended error data field. In FIG. 4E, the command data template 381 comprises one or more of a comparison template, a call template, a return template, and command-specific data which is the data indicated by the one or more present comparison, call, and/or return templates. The various templates of the command data template are described below with respect to FIGS. 5A-5F.

FIGS. 5A-5F depict the structure of exemplary portions of a transport-layer PDU. In FIG. 5A, for an opcode field 370 that indicates file, the comparison template comprises a comparison file ID and a comparison byte offset. In FIG. 5B, for an opcode field 370 that indicates series, the comparison template comprises a comparison series ID and a comparison byte offset. In FIG. 5C, for an opcode field 370 that indicates file, the call template comprises a max returned bytes field, a return file ID, and a return file entry offset. In FIG. 5D, for an opcode field 370 that indicates series, the call template comprises a max returned bytes field, a series ID, and a file series data offset. In FIG. 5E, for an opcode field 370 that indicates file, the return template comprises a return file ID, a file offset, an IFSB total length, and file data. In FIG. 5F, for an opcode field 370 that indicates series, the return template comprises a series ID, a series length, a file series data offset, a file series total data length, one or more file IDs, one or more file lengths, and a file series data starting offset.

Additional details of the frames and fields described above with respect to FIGS. 3A-5F, and possible other structures/configurations of the PDU, are described in the above-incorporated U.S. Provisional Patent Application having Ser. No. 61/464,376.

Figure 6A:
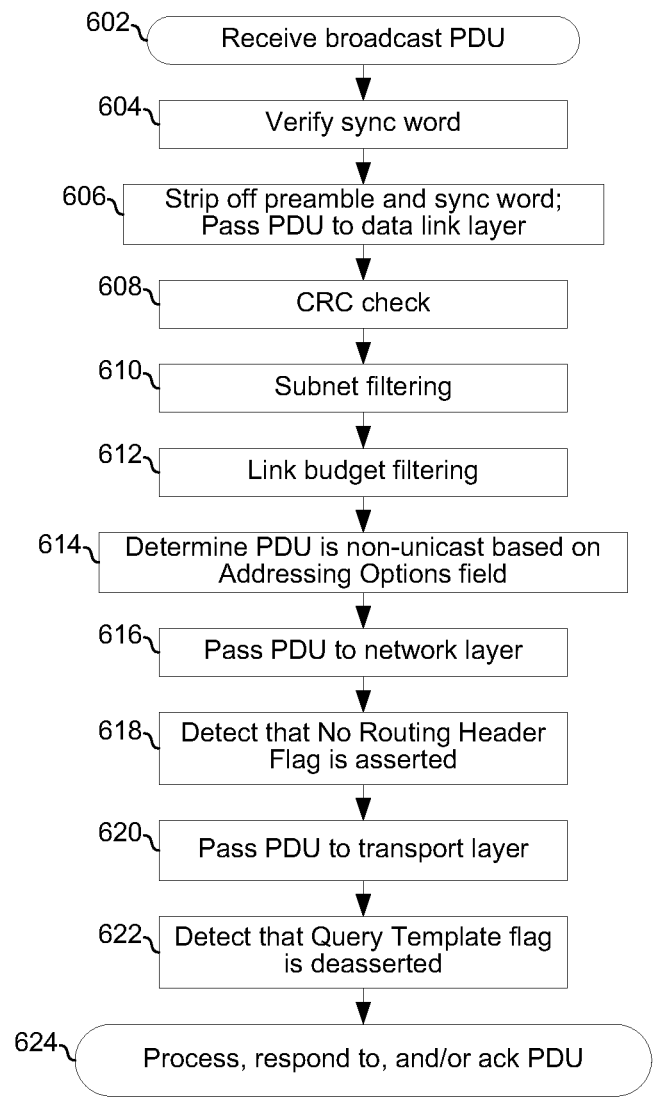
FIG. 6A is a flowchart depicting exemplary steps for processing a broadcast-addressed PDU.

FIG. 6A is a flowchart depicting exemplary steps for processing a broadcast-addressed PDU. The exemplary steps begin with step 602 when a device (e.g., the device 104) receives a broadcast-addressed PDU. In step 604, during physical-layer processing of the received PDU, the contents of the sync word field 306 may be verified to be a valid and/or desired sync word. If not, the received PDU may be discarded. In step 606, the device 104 may strip-off the preamble 308 and the sync word field 306 and pass the PDU to the data link layer.

In step 608, a CRC check may be performed on the received PDU, if the CRC check fails, the PDU may be discarded. In step 610, the device 104 may inspect the subnet field 334 to confirm that the device 104 is on the subnet for which the PDU is intended. If not, the PDU may be discarded. In step 612, the device 104 may determine the difference between the power at which the PDU was received vs. the power at which it was transmitted. Based on this metric, the PDU may be discarded if, for example, it requires a response and it would require too much power to transmit that response. In step 614, the device 104 may inspect the addressing options field 360 and determine that the PDU is non-unicast-addressed. In step 616, the PDU may be passed to the network layer.

In step 618, the No Routing Header flag 362 may be inspected to determine that the Routing Header field 386 is not present in the PDU. In step 620, the PDU may be passed to the transport layer.

In step 622, the device 104 may inspect the Query Template flag 362 and determine that a Query Template field 378 is not present in the PDU. In step 624, the device 104 may further process the PDU, generate and transmit a response to the PDU, and/or generate and transmit an acknowledgment of the PDU.

Figure 6B:
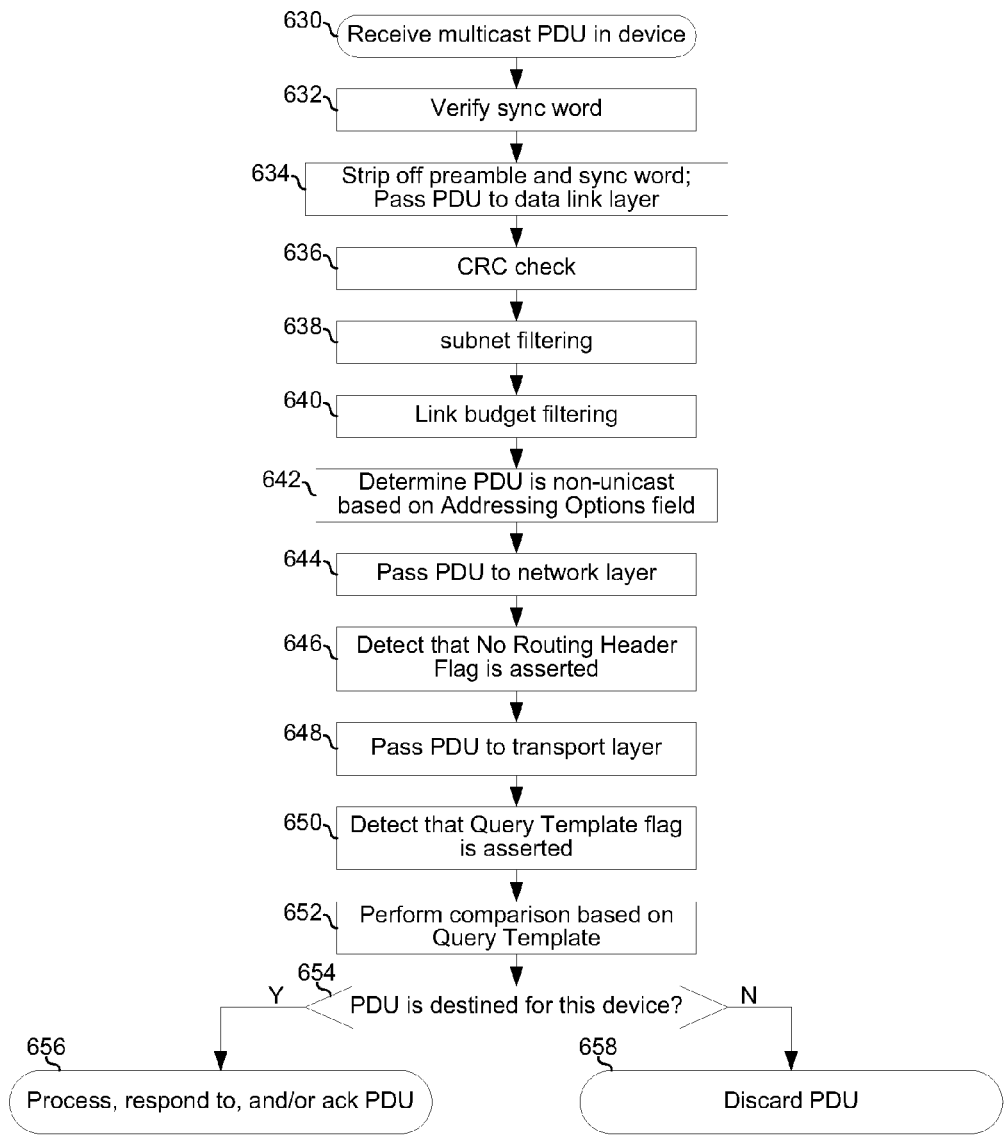
FIG. 6B is a flowchart depicting exemplary steps for processing a multicast-addressed PDU.

FIG. 6B is a flowchart depicting exemplary steps for processing a multicast-addressed PDU. The exemplary steps begin with step 630 when a device (e.g., the device 104) receives a multicast-addressed PDU. In step 632, during physical-layer processing of the received PDU, the contents of the sync word field 306 may be verified to be a valid and/or desired sync word. If not, the received PDU may be discarded. In step 634, the device 104 may strip-off the preamble 308 and the sync word field 306 and pass the PDU to the data link layer.

In step 636, a CRC check may be performed on the received PDU, if the CRC check fails, the PDU may be discarded. In step 638, the device 104 may inspect the subnet field 334 to confirm that the device 104 is on the subnet for which the PDU is intended. If not, the PDU may be discarded. In step 640, the device 104 may determine the difference between the power at which the PDU was received vs. the power at which it was transmitted. Based on this metric, the PDU may be discarded if, for example, it requires a response and it would require too much power to transmit that response. In step 642, the device 104 may inspect the addressing options field 360 and determine that the PDU is not-unicast-addressed. In step 644, the PDU may be passed to the network layer.

In step 646, the No Routing Header flag 362 may be inspected to determine that the Routing Header field 386 is not present in the PDU. In step 648, the PDU may be passed to the transport layer.

In step 650, the device 104 may inspect the Query Template flag 362 and determine that one or more Query Template fields 378/379 are present in the PDU. In step 652, the device 104 may perform a comparison as set forth by the one or more Query Template fields 378/379. In step 654, the device 104 may determine whether it is a device for which the PDU is destined based on the results of the comparison. If the device 104 is not a destination device of the PDU, then in step 658 the device 104 may discard the PDU. If the device 104 is a destination device of the PDU, then in step 656 the device 104 may further process the PDU, generate and send a response to the PDU, and/or generate and send an acknowledgment of the PDU.

Figure 6C:
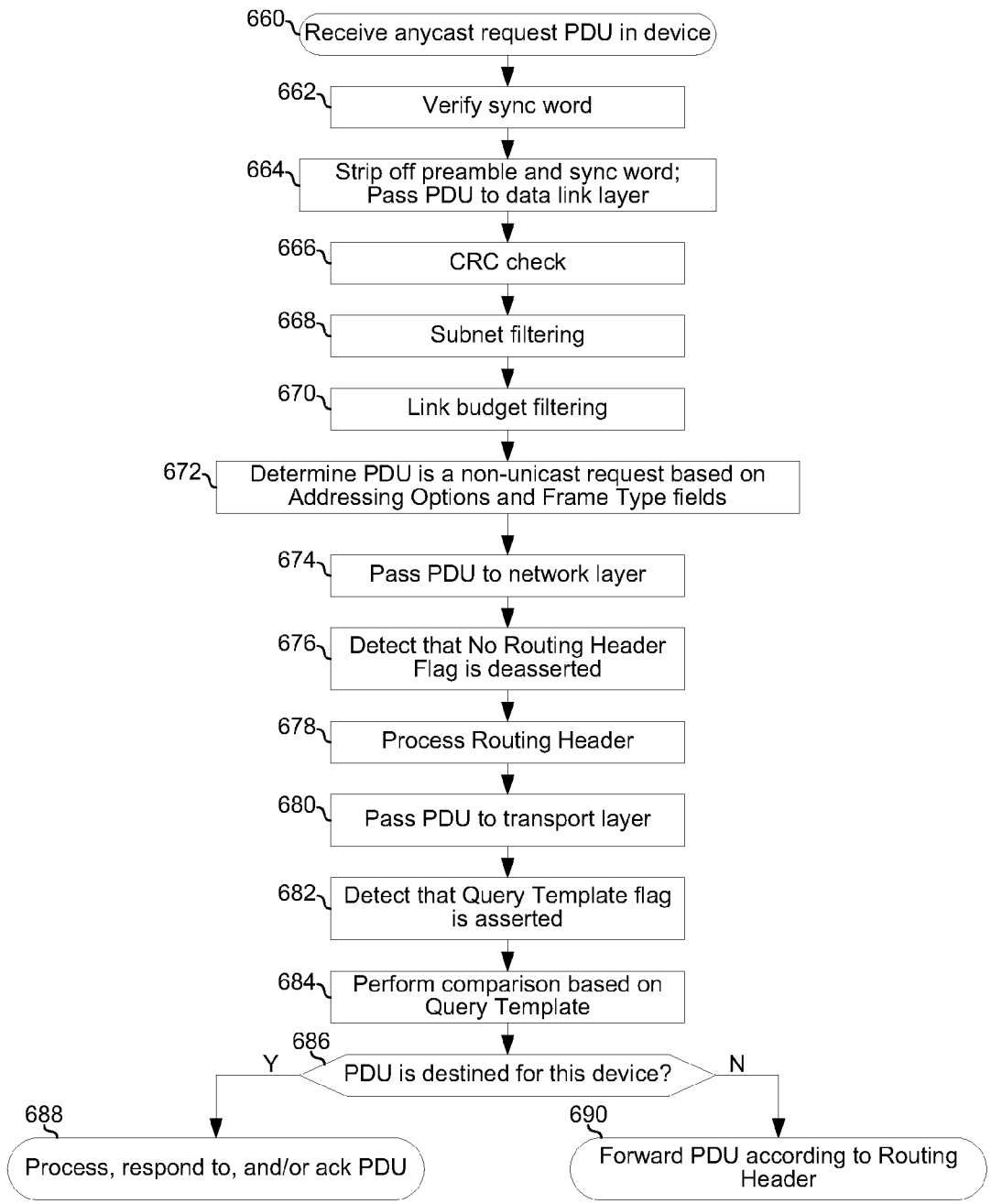
FIG. 6C is a flowchart depicting exemplary steps for processing an anycast-addressed PDU.

FIG. 6C is a flowchart depicting exemplary steps for processing an anycast-addressed PDU. The exemplary steps begin with step 660 when a device (e.g., the device 104) receives an anycast-addressed request PDU. In step 662, during physical-layer processing of the received PDU, the contents of the sync word field 306 may be verified to be a valid and/or desired sync word. If not, the received PDU may be discarded. In step 664, the device 104 may strip-off the preamble 308 and the sync word field 306 and pass the PDU to the data link layer.

In step 666, a CRC check may be performed on the received PDU, if the CRC check fails, the PDU may be discarded. In step 668, the device 104 may inspect the subnet field 334 to confirm that the device 104 is on the subnet for which the PDU is intended. If not, the PDU may be discarded. In step 670, the device 104 may determine the difference between the power at which the PDU was received vs. the power at which it was transmitted. Based on this metric, the PDU may be discarded if, for example, it requires a response and it would require too much power to transmit that response. In step 672, the device 104 may inspect the addressing options field 360 and/or the Frame Type field 358 and determine that the PDU is a non-unicast-addressed request. In step 674, the PDU may be passed to the network layer.

In step 676, the No Routing Header flag 362 may be inspected to determine that the Routing Header field 386 is present in the PDU. In step 678, the Routing Header field 386 may be processed to determine if and/or how the PDU should be forwarded if transport-layer processing of the PDU indicates that the PDU may be forwarded. In step 680, the PDU may be passed to the transport layer.

In step 682, the device 104 may inspect the Query Template flag 362 and determine that one or more Query Template fields 378/379 are present in the PDU. In step 684, the device 104 may perform a comparison as set forth by the one or more Query Template fields 378/379. In step 686, the device 104 may determine whether it is a device for which the PDU is destined based on the results of the comparison. If the device 104 is not a destination device of the PDU, then in step 690 the device 104 may forward the PDU in accordance with the Routing Header field 386 (e.g., forward the PDU if the Routing Header field 386 indicates there are one or more hops remaining). If the device 104 is a destination device of the PDU, then in step 688 the device 104 may further process the PDU, generate and send a response to the PDU, and/or generate and send an acknowledgment of the PDU.

Figure 6D:
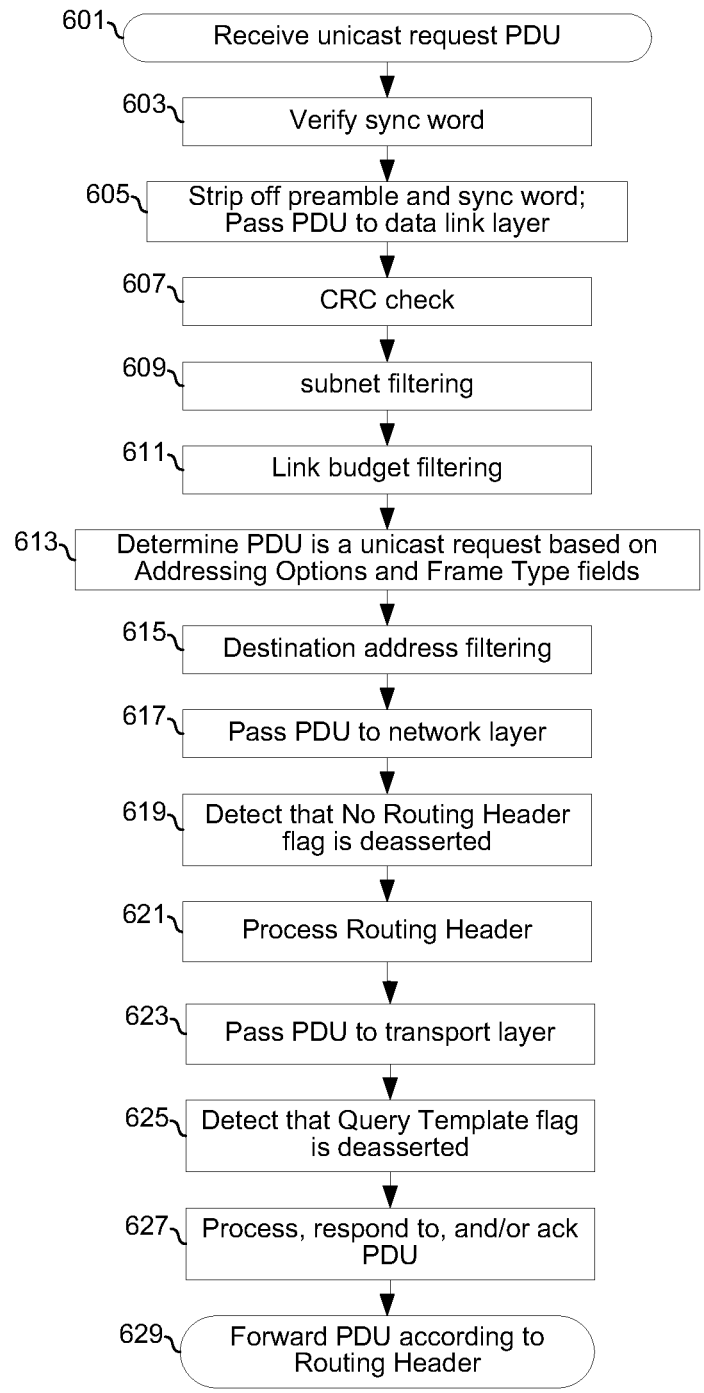
FIG. 6D is a flowchart depicting exemplary steps for processing a unicast-addressed request PDU.

FIG. 6D is a flowchart depicting exemplary steps for processing a unicast-addressed request PDU. The exemplary steps begin with step 601 when a device (e.g., the device 104) receives a unicast-addressed request PDU. In step 603, during physical-layer processing of the received PDU, the contents of the sync word field 306 may be verified to be a valid and/or desired sync word. If not, the received PDU may be discarded. In step 605, the device 104 may strip-off the preamble 308 and the sync word field 306 and pass the PDU to the data link layer.

In step 607, a CRC check may be performed on the received PDU, if the CRC check fails, the PDU may be discarded. In step 609, the device 104 may inspect the subnet field 334 to confirm that the device 104 is on the subnet for which the PDU is intended. If not, the PDU may be discarded. In step 611, the device 104 may determine the difference between the power at which the PDU was received vs. the power at which it was transmitted. Based on this metric, the PDU may be discarded if, for example, it requires a response and it would require too much power to transmit that response. In step 613, the device 104 may inspect the addressing options field 360 and/or the Frame Type field 358 and determine that the PDU is a unicast-addressed request. In step 615, the device 104 may verify that the Target ID field 322 of the PDU matches the Device ID (which may be a hardware-specific ID or a virtual ID) of the device 104. (If NLS is utilized, step 615 may be performed at the network layer based on the Target Address field 389.) In step 617, the PDU may be passed to the network layer.

In step 619, the No Routing Header flag 362 may be inspected to determine that a Routing Header field 386 is not present in the PDU. In step 621, the Routing Header field 386 may be processed to determine if and/or how the PDU should be forwarded if transport-layer processing of the PDU indicates that the PDU may be forwarded. In step 623, the PDU may be passed to the transport layer.

In step 625, the device 104 may inspect the Query Template flag 362 and determine that a Query Template field 378/379 is not present in the PDU. In step 627, the device 104 may inspect the contents of the Target ID 322 and the Destination Device ID 393 and determine if the device 104 may further process the PDU, generate and send a response to the PDU, and/or generate and send an acknowledgment of the PDU. In step 629 the device 104 may forward the PDU in accordance with the Routing Header field 386 (e.g., forward the PDU if the Routing Header field 386 indicates there are one or more hops remaining).

Figure 6E:
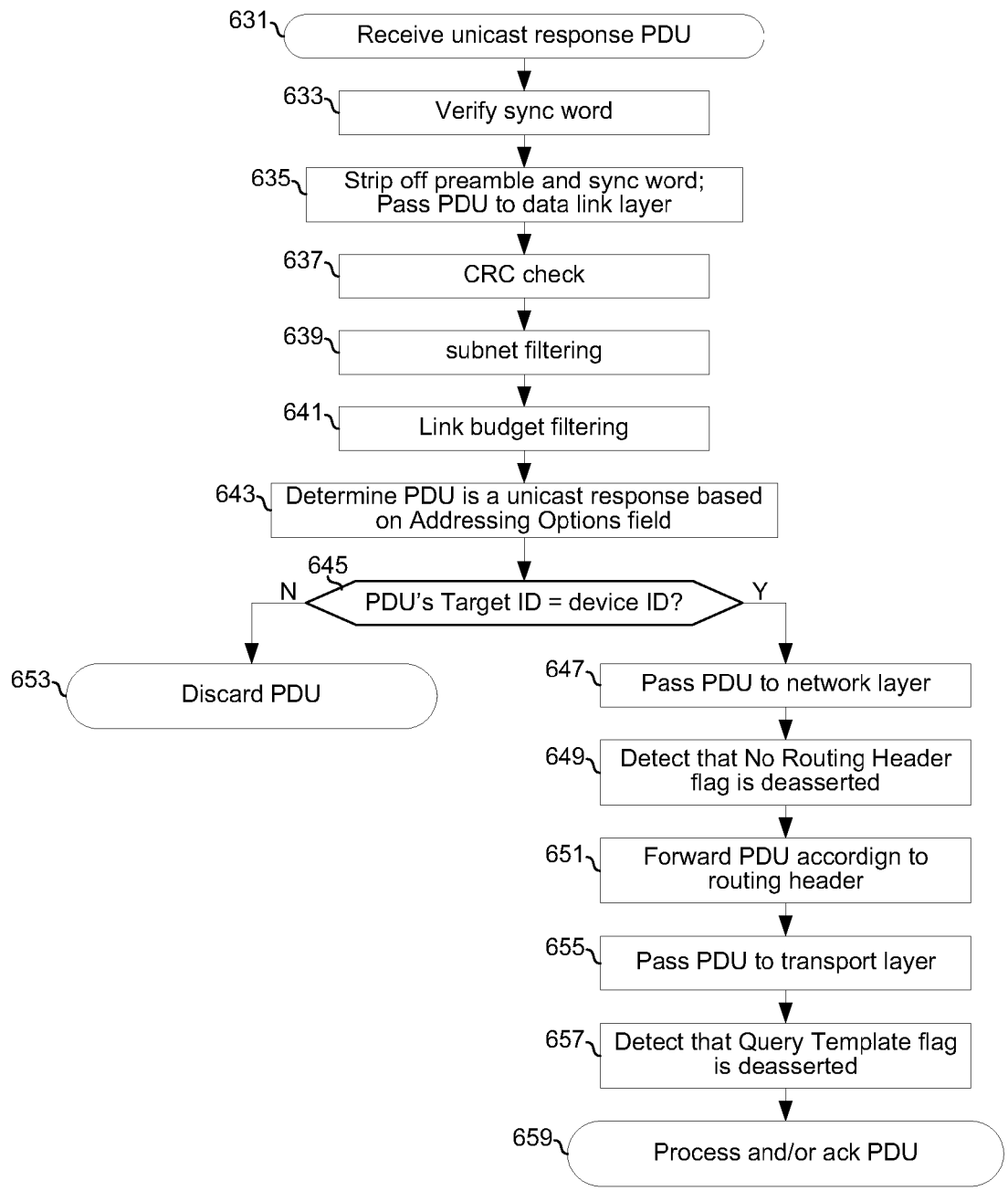
FIG. 6E is a flowchart depicting exemplary steps for processing a unicast-addressed response PDU.

FIG. 6E is a flowchart depicting exemplary steps for processing a unicast-addressed response PDU. The exemplary steps begin with step 631 when a device (e.g., the device 104) receives a unicast-addressed response PDU. In step 633, during physical-layer processing of the received PDU, the contents of the sync word field 306 may be verified to be a valid and/or desired sync word. If not, the received PDU may be discarded. In step 635, the device 104 may strip-off the preamble 308 and the sync word field 306 and pass the PDU to the data link layer.

In step 637, a CRC check may be performed on the received PDU, if the CRC check fails, the PDU may be discarded. In step 639, the device 104 may inspect the subnet field 334 to confirm that the device 104 is on the subnet for which the PDU is intended. If not, the PDU may be discarded. In step 641, the device 104 may determine the difference between the power at which the PDU was received vs. the power at which it was transmitted. Based on this metric, the PDU may be discarded if, for example, it requires a response and it would require too much power to transmit that response. In step 643, the device 104 may inspect the addressing options field 360 and/or the Frame Type field 358 and determine that the PDU is a unicast-addressed response. In step 645, the device 104 may verify that the Target ID field 322 of the PDU matches the Device ID (which may be a hardware-specific ID or a virtual ID) of the device 104. (If NLS is utilized, step 645 may be performed at the network layer based on the Target Address field 389.) If the contents of the Target ID field 322 match the device ID of device 104, then the exemplary steps may advance to step 647.

In step 647, the PDU may be passed to the network layer. In step 649, the No Routing Header flag 362 may be inspected to determine that the Routing Header field 386 is present in the PDU. In step 651 the device 104 may forward the PDU in accordance with the Routing Header field 386 (e.g., forward the PDU if the Routing Header field 386 indicates there are one or more hops remaining). In step 655, the PDU may be passed to the transport layer. In step 657, the device 104 may inspect the Query Template flag 362 and determine that a Query Template field 378/379 is not present in the PDU. In step 659 the device 104 may further process the PDU and/or generate and send an acknowledgment of the PDU.

Returning to step 645, if the contents of the Target ID field 322 do not match the device ID of device 104, then the exemplary steps may advance to step 653 in which the device 104 may discard the PDU.

In accordance with an exemplary embodiment of the invention, an electronic device 104 may receive a protocol data unit (PDU) 302 comprising a plurality of addressing bits in an Addressing Options field 360. The device 104 may perform data-link-layer processing of the PDU based on each bit of the Addressing Options field 360. The device 104 may perform network layer processing of the PDU based on a first subset (e.g., a Query Template flag 360) of the plurality of addressing bits, and perform transport-layer processing of the PDU based on a second subset (e.g., a No Routing Header flag 362) of plurality of addressing bits. The data-link-layer processing of the PDU may comprise determining whether the PDU is a unicast-addressed PDU or non-unicast-addressed PDU.

In instances that the PDU is a unicast-addressed PDU, the data-link-layer processing may comprise determining whether the PDU is destined for the electronic device based on a comparison of a Target ID field 322 of the PDU and a device ID of the electronic device 104. In instances that the PDU is a non-unicast-addressed PDU, the Target ID field 322 may not be present in the PDU and whether the PDU is destined for the electronic device may be determined based on criteria other than a device ID of the electronic device 104 (e.g., based on a Query Template field). In instances that the PDU is a non-unicast-addressed PDU, the network-layer processing of the PDU may comprise determining whether the PDU comprises a Routing header field. In instances that the PDU is a non-unicast-addressed PDU, the transport-layer processing of the PDU may comprise determining whether the PDU comprises one or more Query Template fields 378/379.

During the transport-layer processing of the PDU, the electronic device 104 may compare data in the Query Template field(s) 378/379 to data stored in the electronic device (e.g., the device 104 may search its memory 216 for a string contained in the Query Template field and/or may determine compare the contents of a memory location specified by the Query Template field 348/379 to a value in the Query Template field 378/379). During the transport-layer processing of the PDU, a result of the comparison may be utilized to determine whether the electronic device 104 is an intended recipient of the PDU. During the transport-layer processing of the PDU, a result of the comparison may be utilized to determine whether to forward the PDU to another electronic device. For example, the transport-layer processing may comprise comparing a search token contained in the PDU to data stored in the electronic device 104, with the PDU being determined to be intended for the electronic device when, for example, a correlation between the search token and the data stored in the electronic device may be above a threshold. In this regard, the search token may correspond to setting of the comparison type field in the compare code field of the query template 378/379 to particular value (e.g., binary "10"), with the correlation threshold being set in such instances to the value corresponding to the comparison parameters field of the compare code field of the query template 378/379, as described in FIG. 4C.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for addressing in a resource-constrained network.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method performed by an electronic device, the method comprising:
   receiving a protocol data unit (PDU) comprising a plurality of addressing bits;
   performing data-link-layer processing of said PDU based on each of said plurality of addressing bits;
   performing network layer processing of said PDU based on a first subset of said plurality of addressing bits; and
   performing transport-layer processing of said PDU based on a second subset of said plurality of addressing bits; and
   wherein said data-link-layer processing of said PDU comprises determining whether said PDU is a unicast-addressed PDU or non-unicast-addressed PDU; and
   wherein, in instances that said PDU is a unicast-addressed PDU, said data-link-layer processing comprises determining whether said PDU is destined for said electronic device based on a comparison of a Target ID field of said PDU and a device ID of said electronic device; and
   wherein, in instances that said PDU is a non-unicast-addressed PDU, said Target ID field is not present in said PDU and whether said PDU is destined for said electronic device is determined based on criteria other than a device ID of said electronic device.

2. The method of claim 1, wherein, in instances that said PDU is a non-unicast-addressed PDU, said network-layer processing of said PDU comprises determining whether said PDU comprises a Routing Header field.

3. The method of claim 1, wherein, in instances that said PDU is a non-unicast-addressed PDU, said transport-layer processing of said PDU comprises determining whether said PDU comprises a Query Template field.

4. The method of claim 3, wherein, during said transport-layer processing of said PDU, said electronic device compares data in said Query Template field to data stored in said electronic device.

5. The method of claim 4, wherein, during said transport-layer processing of said PDU, a result of said comparison is utilized to determine whether said electronic device is an intended recipient of said PDU.

6. The method of claim 4, wherein, during said transport-layer processing of said PDU, a result of said comparison is utilized to determine whether to forward said PDU to another electronic device.

7. A communication system comprising: an electronic device operable to: receive a protocol data unit (PDU) comprising a plurality of addressing bits; perform data-link-layer processing of said PDU based on each of said plurality of addressing bits; perform network layer processing of said PDU based on a first subset of said plurality of addressing bits; and perform transport-layer processing of said PDU based on a second subset of said plurality of addressing bits; and
   wherein said data-link-layer processing of said PDU comprises determining whether said PDU is unicast-addressed or non-unicast-addressed PDU; and
   wherein, in instances that said PDU is a unicast-addressed PDU, said data-link-layer processing comprises determining whether said PDU is destined for said electronic device based on a comparison of a Target ID field of said PDU and a device ID of said electronic device; and
   wherein, in instances that said PDU is a non-unicast-addressed PDU, said Target ID field is not present in said PDU and whether said PDU is destined for said electronic device is determined based on criteria other than a device ID of said electronic device.

8. The communication system of claim 7, wherein, in instances that said PDU is a non-unicast-addressed PDU, said network-layer processing of said PDU comprises determining whether said PDU comprises a Routing Header field.

9. The communication system of claim 7, wherein, in instances that said PDU is a non-unicast-addressed PDU, said transport-layer processing of said PDU comprises determining whether said PDU comprises a Query Template field.

10. The communication system of claim 9, wherein, during said transport-layer processing of said PDU, said electronic device compares data in said Query Template field to data stored in said electronic device.

11. The communication system of claim 10, wherein, during said transport-layer processing of said PDU, a result of said comparison is utilized to determine whether said electronic device is an intended recipient of said PDU.

12. The communication system of claim 10, wherein, during said transport-layer processing of said PDU, a result of said comparison is utilized to determine whether to forward said PDU to another electronic device.

* * * * *